(12) United States Patent
Cudennec et al.

(10) Patent No.: US 11,422,874 B2
(45) Date of Patent: Aug. 23, 2022

(54) VISUALIZATION INFRASTRUCTURE FOR WEB APPLICATIONS

(71) Applicant: SCHLUMBERGER TECHNOLOGY CORPORATION, Sugar Land, TX (US)

(72) Inventors: Alain Cudennec, Houston, TX (US); Farid Harhad, Houston, TX (US); Arnaud Houegbelo, Houston, TX (US); Yuri Vanzine, Fulshear, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/646,658

(22) PCT Filed: Sep. 12, 2018

(86) PCT No.: PCT/US2018/050739
§ 371 (c)(1),
(2) Date: Mar. 12, 2020

(87) PCT Pub. No.: WO2019/055556
PCT Pub. Date: Mar. 21, 2019

(65) Prior Publication Data
US 2020/0401468 A1 Dec. 24, 2020

Related U.S. Application Data

(60) Provisional application No. 62/557,645, filed on Sep. 12, 2017.

(51) Int. Cl.
*G06F 9/54* (2006.01)
*G06F 8/36* (2018.01)
*G06F 8/38* (2018.01)

(52) U.S. Cl.
CPC ............... *G06F 9/547* (2013.01); *G06F 8/36* (2013.01); *G06F 8/38* (2013.01)

(58) Field of Classification Search
CPC ............... G06F 9/547; G06F 8/36; G06F 8/38
See application file for complete search history.

(56) References Cited

U.S. PATENT DOCUMENTS 6,167,442 A * 12/2000 Sutherland ............. G06F 16/51
709/217
8,245,125 B1   8/2012 Pupius et al.
(Continued)

FOREIGN PATENT DOCUMENTS

CN      108170409 A  *  6/2018

OTHER PUBLICATIONS

International Preliminary Report on Patentability for the counterpart International patent application PCT/US2018/050739 dated Mar. 26, 2020.

(Continued)

*Primary Examiner* — S. Sough
*Assistant Examiner* — Kimberly L Jordan
(74) *Attorney, Agent, or Firm* — Michael Guthrie

(57) ABSTRACT

Web application code includes a unified rendering application programming interface (API) library and unified rendering API calls. The unified rendering API calls comply with call definitions and are to library functions. The library functions are in both a server rendering library and a client rendering library. The call definitions are the same for using the server rendering library and the client rendering library. From a client computing device and a server computing device, a rendering system is identified for rendering a visualization to obtain an identified system. The rendering library matching the rendering system is linked to the web (Continued)

application code, where the rendering library is at least of the client rendering library or the server rendering library.

19 Claims, 11 Drawing Sheets

(56) References Cited

U.S. PATENT DOCUMENTS

| | | |
|---|---|---|
| 2012/0084350 A1 | 4/2012 | Xie |
| 2014/0028703 A1 | 1/2014 | Pajak et al. |
| 2014/0082047 A1* | 3/2014 | Krannich ............ G06Q 10/103 709/203 |
| 2014/0111527 A1 | 4/2014 | Huang et al. |
| 2017/0185609 A1 | 6/2017 | Braghin et al. |
| 2017/0228447 A1 | 8/2017 | Catania et al. |

OTHER PUBLICATIONS

International Search Report and Written Opinion for the counterpart International patent application PCT/US2018/050739 dated Jan. 11, 2019.

Extended European Search Report issued in European Patent Application No. 18856698.8 dated Apr. 15, 2021, 7 pages.

Dollner, J. et al., "A generic rendering system", IEEE Transactions on Visualization and Computer Graphics, 2002, 8(2), pp. 99-118.

* cited by examiner

VISUALIZATION INFRASTRUCTURE FOR WEB APPLICATIONS

CROSS-REFERENCE TO RELATED APPLICATIONS

The present application claims priority under 35 U.S.C. § 119(e) to U.S. Provisional Application No. 62/557,645, filed on Sep. 12, 2017, having at least one of the same inventors as the present application, and entitled, "CLOUD VISUALIZATION INFRASTRUCTURE FOR ENERGY-RELATED WEB-BASED APPLICATIONS." U.S. Provisional Application No. 62/557,645 is incorporated herein by reference.

BACKGROUND

One of the many operations performed by computing systems is to provide visualizations. The visualizations may be a display of a model, entertainment images, or other image. For example, the visualizations may be used to perform medical operations, create physical tools and other objects, and perform oilfield operations. For example, operations, such as geophysical surveying, drilling, logging, well completion, and production operations are often driven by the visualizations displayed to users to provide insight into the data being viewed. The visualizations allow the user to interact with a color encoded coded form of the data in order to obtain particular insight into the data.

SUMMARY

In general, in one aspect, web application code includes a unified rendering application programming interface (API) library and unified rendering API calls. The unified rendering API calls comply with call definitions and are to library functions. Each of the library functions is in both a server rendering library and a client rendering library. The call definitions are the same for using the server rendering library and the client rendering library. From a client computing device and a server computing device, a rendering system is identified for rendering a visualization to obtain an identified system. The rendering library matching the rendering system is linked to the web application code, wherein the rendering library is at least of the client rendering library or the server rendering library. The web application may be transmitted to the client computing device.

Other aspects of the invention will be apparent from the following description and the appended claims.

DETAILED DESCRIPTION

Figure 1:
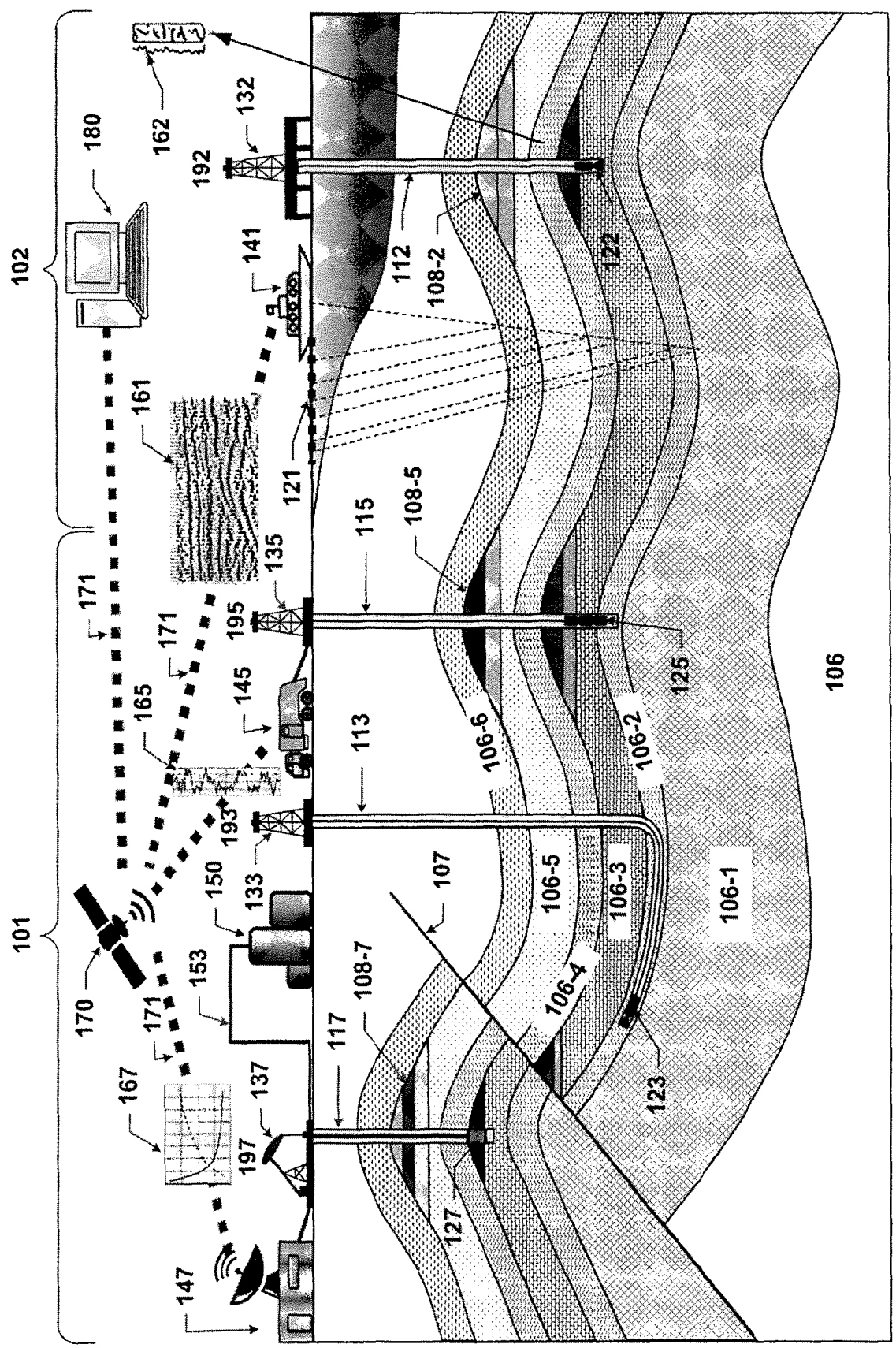
FIG. 1 shows a diagram of a system in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a unified rendering library by which developers may create a web application that includes visualizations and have the visualizations performed on either the client computing system or the server computing system. In particular, both the client computing system and the server computing system may include rendering engines capable of rendering a visualization from an image definition for the visualization. The rendering engines on the client computing system and the server computing system include a same application programming interface. Thus, a developer of the web application may include the same calls in the web application code regardless of whether the client computing system or the server computing system is used for the rendering system. The web application code may further include a unified API library. The unified API library is configured to manage interactions with the client rendering engine or the server rendering engine.

In one or more embodiments, selection of the client rendering engine or the server rendering engine is in the web application code. For example, when a developer defines an image object, the image object may be of a type for a client image or a server image. If the image object is a client image type, then unified API library interprets the calls using the image object to the client rendering engine. If the image object is a server image type, then the unified API library interprets the calls using the server rendering engine. In the example, by the developer merely changing a single instantiation in the web application code, the developer changes whether the visualization is rendered on the client computing system or the server computing system.

By way of another example, the rendering system may be selected at runtime. For example, the rendering system may be selected according to one or more predefined criterion. In such a scenario, the unified API library may select the rendering engine to use while the web application is executing.

FIG. 1 shows a diagram of an oilfield system in accordance with disclosed embodiments. Although one or more embodiments may be used in other domains without departing from the scope of the claims, one or more embodiments may be used with respect to rendering visualizations for an oilfield system. In particular, as shown with relation to FIG. 1, the oilfield domain involves the creation (e.g., through sensor signals and interpolation), storage, and analysis of large volumes of data. The oilfield domain further includes thousands of individuals, at various locations viewing and interacting with visualizations created by the large volumes of data. While some visualizations displayed to individuals are detailed indicating that server rendering engine is more desired, others involve less information indicating that the client rendering engine is more desired. Similarly, when developing a web application in the oilfield, a developer may desire to create a prototype that uses a client rendering engine. If the prototype is approved, the developer may desire to change the web application to using the server rendering engine for the same visualization. Thus, using one or more embodiments disclosed herein, the computing systems are able to provide the flexibility to manage the different visualizations of the oilfield domain at different stages of development.

FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) includes a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an exploration and production (E&P) computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

In one or more embodiments, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In one or more embodiments, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In one or more embodiments, the surface units (141), (145), and (147) are communicatively coupled to the E&P computer system (180) via the communication links (171). In one or more embodiments, the communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. In one or more embodiments, the E&P computer system (180) is provided with functionality for manipulating and analyzing the data, such as analyzing seismic data to determine locations of hydrocarbons in the geologic sedimentary basin (106) or performing simulation, planning, and optimization of exploration and production operations of the wellsite system. In one or more embodiments, the results generated by the E&P computer system may be displayed for user to view the results in a two-dimensional (2D) display, three-dimensional (3D) display, or other suitable displays as a visualization. Although the surface units are shown as separate from the E&P computer system in FIG. 1, in other examples, the surface unit and the E&P computer system may also be combined. The E&P computer system and/or surface unit may correspond to a computing system, such as the computing system shown in FIGS. 16 and 17 and described below.

Figure 2:
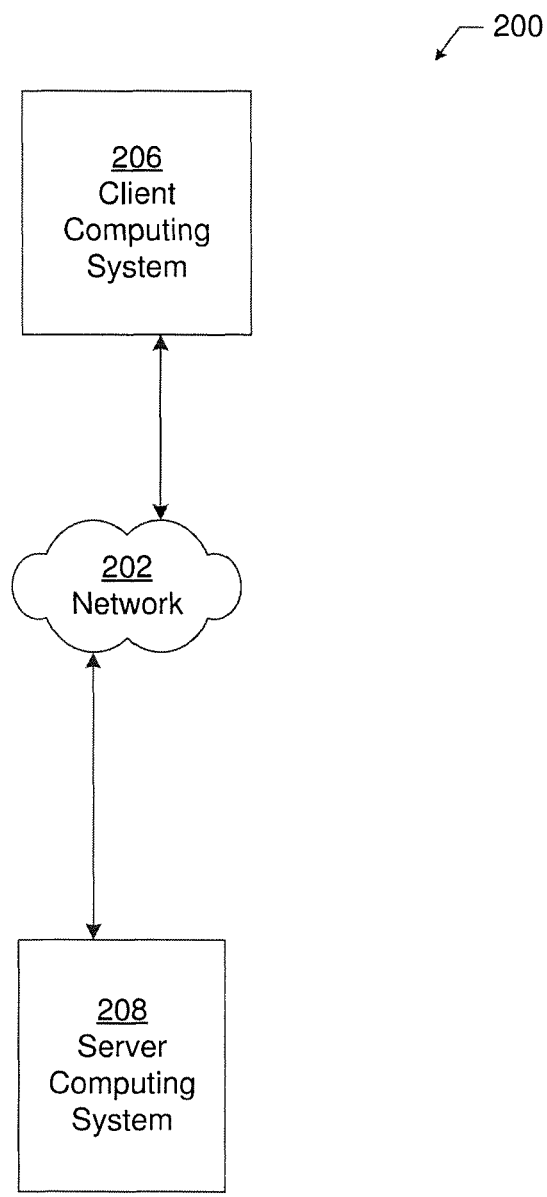
FIG. 2 shows a network system in accordance with disclosed embodiments.

The E&P computer system may be any of a server computing system, the client computing system, or another computing system in FIG. 2. FIG. 2 shows a network system (200) in accordance with disclosed embodiments. As shown in FIG. 2, the network system (200) includes a network (202) that connects a client computing system (206) to a server computing system (208). Each of these components are described below.

The network (202) may be a local area network, a wide area network, or a combination thereof. The client computing system (206) is configured to display visualizations generated from image data for a user. Specifically, the image data is any data that is used during runtime from which a visualization is displayed. For example, the image data may be sensor data, wellsite data, information about drilling instruments, or other information. The client computing system (206) is configured to execute a web application in a browser. Multiple client computing systems may exist that each concurrently execute the web application. For example, different users may concurrently analyze the image data. The server computing system (208) is an application server configured to provide the web application to the client. The server computing system may include multiple physical devices. The various devices may be replicas and/or provide various functionality for transmitting the web application.

In one or more embodiments, the server computing system (208) has greater computing resources (e.g., storage, memory, hardware processing resources) than the client computing system (206). Further, the latency between the server rendering on the server computing system and the image data source (described below) may be orders of magnitude less than the latency between the client computing system (206) and the image data source. For example, the server computing system (208) and image data source may be on the same physical hardware, on the same intranet, whereas the client computing system may be connected via the Internet and virtual private network (VPN) to the server computing system and the image data source. The server computing system (208) may provide application server services for multiple client computing devices concurrently.

Figure 3:
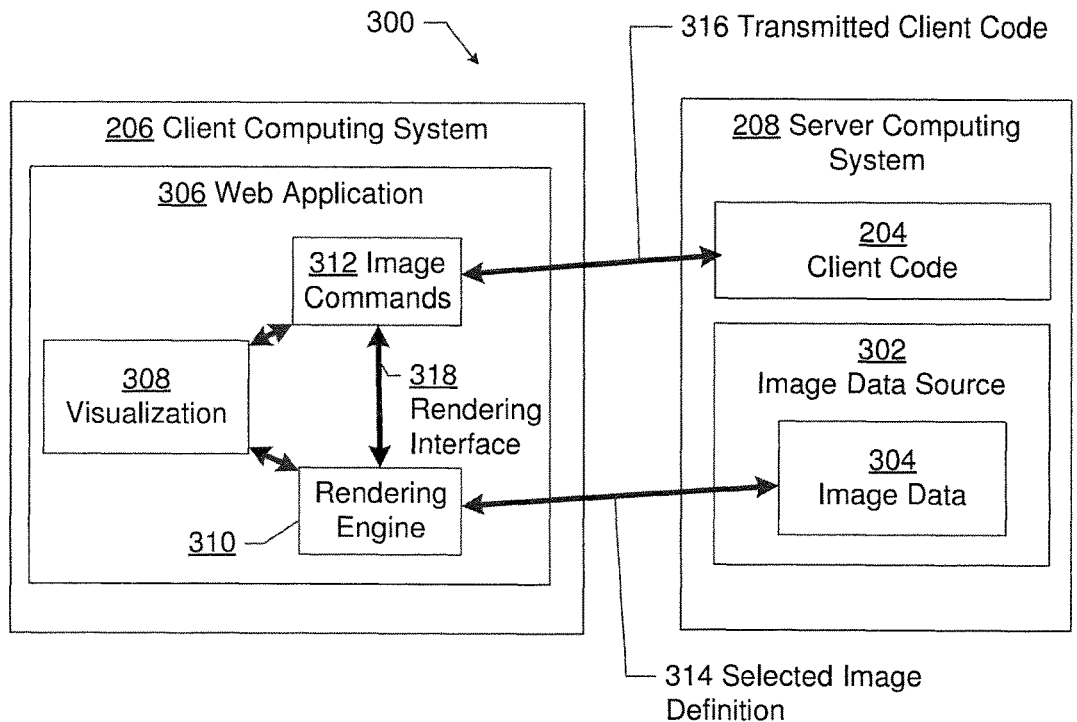
FIG. 3 shows a client side rendering diagram in accordance with disclosed embodiments.
Figure 4:
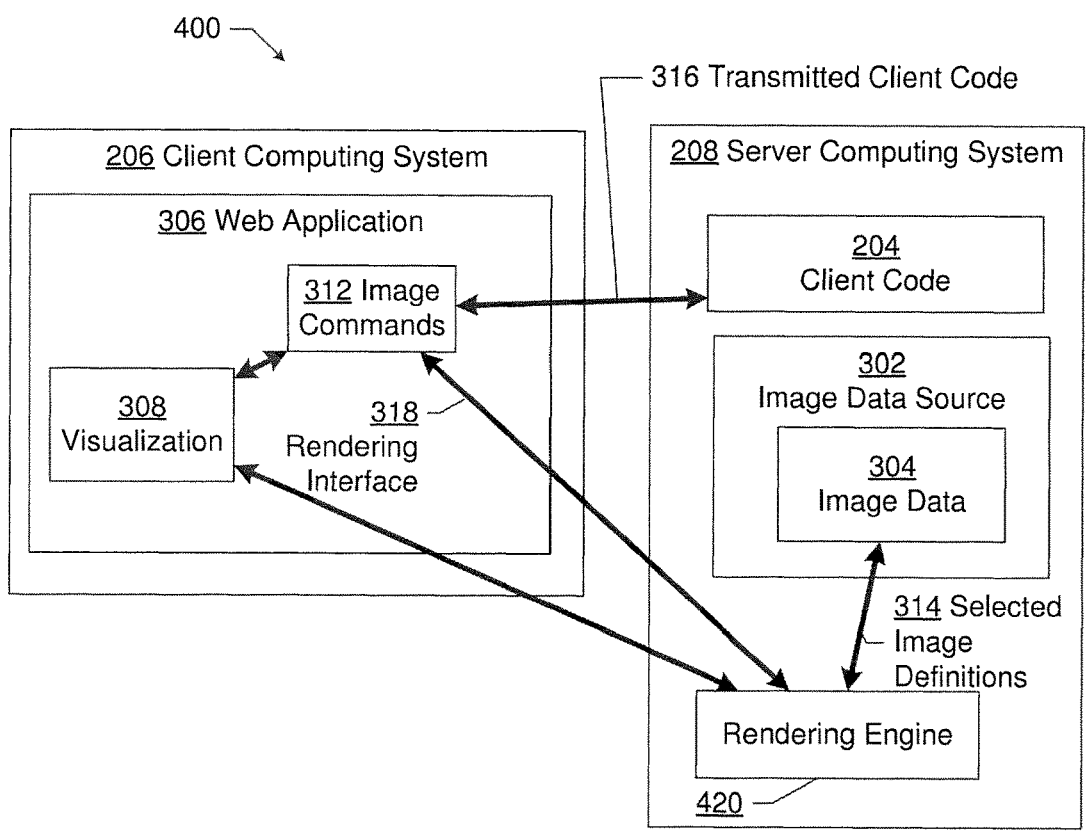
FIG. 4 shows a server side rendering diagram in accordance with disclosed embodiments.

FIGS. 3 and 4 show rendering options in accordance with one or more embodiments of the invention. FIGS. 3 and 4 are block diagrams of the software system in accordance with disclosed embodiments. In order to simplify the description, the network shown in FIG. 2 is omitted along with various hardware elements. FIG. 3 shows a client side rendering diagram (300) in accordance with disclosed embodiments. The client side rendering diagram (300) illustrates an embodiment in which the client computing system (206) is selected as the rendering system. As shown in FIG. 3, the client computing system (206) is connected to the server computing system (208). The server computing system (208) includes client code (204) and an image data source (302) having image data (304). The image data source (302) is any storage unit or device for storing data. For example, the image data source may be a file system, database, memory, or other storage system or combination thereof.

Further, the image data (304) is any data that is displayed as part of a visualization. For example, the image data (304) may be measurement values (e.g., values of porosity and permeability) using sensors, calculated values, and other values. The image data (304) may include shape definitions, such as in JAVASCRIPT Object Notation (JSON) object. A shape definition defines the geometry of the shape. In one or more embodiments, the shape definition describes a three dimensional region forming the shape, such as the shape's boundary. The shape definition may be defined using vector graphics. The shape definition may further include the one or more properties represented by the shape. The value of the property may be in a different file. For example, the shape definition may exist for chemical composition, and the property value or values may be the amount of each chemical corresponding to the location represented by the shape.

The client code (206) is the code for a web application (306). Transmitted client code (316) is instructions for the web application. A web application (306) is a software application that is configured to be executed within a web browser. The web application (306) is accessible by opening the web browser and directing the web browser to access a location of the web application. The web application is then executed within the web browser.

The web application (306) includes functionality to present a visualization (308). A visualization (308) is at least one displayed image. The visualization may be a static image or a series of images (e.g., an animation). In one or more embodiments, the visualization (308) is a graphical diagram. For example, the visualization may be a two dimensional or three dimensional scaled display of a geographic region. Each location in the visualization corresponds to a location in the geographic region. For example, a one to one mapping may exist between locations in the visualization and locations in the geographic region. The visualization may be color encoded such that the color of the location represents a value of a property at the location of the geographic region. By way of an example, the visualization may be a porosity map whereby the color of each location on the map corresponds to the porosity at the corresponding location. By way of another example, the visualization may be an animation of a tool with an overlay representing the attributes of the tool.

The visualization (308) is generated by a rendering engine (310) according to image commands (312). A rendering engine (310) is a software program configured to render a visualization using a selected image definition (314). The selected image definition (314) is the portion of the image data (304) that is selected to be used for the visualization. For example, the selected image definition (314) may include property values of the property represented by the image, shape definitions, and other attributes of the visualization that is stored in the image data source. The rendering engine (310) is a software program that is reasonable for generating the graphical output. Basically, the job of a rendering engine is to convert the model defined by the various discrete parts of the selected image definition into a series of pixel brightness's that can be displayed by a monitor or other hardware display. For example, for a three dimensional visualization, the rendering engine might take a collection of three dimensional polygons as input, as well as shape properties, display angle, and generate two dimensional images to be outputted to the hardware display.

In the embodiments shown in FIG. 3, the rendering engine (310) executes on the client, such as being part of the web browser or even a part of the web application (310). For example, the rendering engine (310) may be a lightweight program.

An image command (312) is any command that requests the creation of and defines how to create the visualization (308). The image command (312) may be a unified rendering API call to a function of the rendering engine. The unified rendering API call complies with a call definition of the function of the rendering engine (310). The rendering interface (318) is the set of API call definitions supported by the functions of the rendering engine (310).

In the embodiment shown in FIG. 3, when the web application (306) is executing, the image commands (312) includes a command that sends a request for an image data selection to the image data source. The request for image data selection may be via the rendering engine (310) or direct from the web application. The image commands (312) further include calls to the rendering engine (310) that complies with the rendering interface (318) to create the visualization (308). Thus, the selected image definition (314) is transmitted from the image data source (302) to the client computing system (206) for use by the rendering engine (310). The rendering engine (310) then creates the visualization (308). Mouse events and other user events are transmitted from the web application to the rendering engine (310) to update the visualization (308).

The amount of data for the visualization (308) may be much smaller than the amount of data of the selected image definition (314) depending on the resolution of the image. Thus, bandwidth limitations of the network may prevent visualizations of large datasets in the browser. Similarly, because the rendering engine (310) operates on the client computing system (206), the rendering engine (310) uses the resources of the client computing system (206). Therefore, the rendering engine (310) may be limited in the amount of resources used and may limit other applications in using the client computing resources. Once a visualization is rendered, the various user input events are transmitted locally to the rendering engine. Thus, latency of responsiveness of displaying an updated visualization when the user submits a user input event is reduced.

FIG. 4 shows a server side rendering diagram (400) in accordance with disclosed embodiments. The server side rendering diagram (400) illustrates an embodiment in which the server computing system (208) is selected as the rendering system. Like named and numbered components in FIG. 4 as compared to the corresponding components in FIG. 3 are the same as described above with reference to FIG. 3. Accordingly, the components are not further described. As shown in FIG. 4, server side rendering diagram (400) is similar to FIG. 3 with the exception that the rendering engine (420) is located on the server computing system (208). The rendering engine (420) in FIG. 4 may be the same or similar to the rendering engine (310) of FIG. 3 and may include additional functionality. For example, the rendering engine (420) may be a full application rather than a lightweight program as in some embodiments of FIG. 3.

In the embodiment shown in FIG. 4, when the web application (306) is executing, the image commands (312) includes a command that sends a request for an image data selection to the image data source (302). The request for image data selection (316) may be via the rendering engine (310) or direct from the web application (306), such as in the calls using the rendering interface. The image commands (312) further include calls to the rendering engine (420) that complies with the rendering interface (318) to create the visualization (308).

The image commands (312) trigger the rendering engine (420) to obtain the selected image definition (314). Accordingly, the selected image definition (314) is transmitted from the image data source (302) to the server computing system (208) for use by the rendering engine (420). The rendering engine (420) then creates the visualization (308) and sends the visualization (308) to the client computing system (206). Mouse events and other user events are transmitted from the client computing system (206) to the rendering engine (420) on the server computing system (208) to update the visualization (308). The updated visualization (308) is then transmitted back to the client computing system (206).

The amount of data for the visualization (308) may be much smaller than the amount of data of the selected image definition (314) depending on the resolution of the image. Further, because of fewer intermediary network devices and connection speeds between components, the selected image definition (314) may be transmitted faster to the server computing system (208) than to the client computing system (206). Because the bandwidth requirements for the visualization (308) may be much smaller than the bandwidth requirements for the selected image definitions (314), performing the rendering on the server may be desirable. Further, the rendering engine is not limited to the client computing system resources (206). However, if a large number of client computing systems are concurrently requesting an image to be rendered, the aggregate use of server computing system resources (208) may result in higher latency for each visualization. Once a visualization is rendered, the various user input events are transmitted remotely to the rendering engine (420). Thus, latency of responsiveness of displaying an updated visualization when the user submits a user input event is increased as compared to local rendering.

As shown, the variation in different performance metrics between using a remote rendering engine and a local rendering engine may cause a particular rendering system to be more desired in certain circumstances. For example, large volumes of data as the selected image definition and minimal number of users may cause rendering on the server computing system to be more desirable whereas, smaller data sets and large numbers of users may cause rendering on the client computing system to be more desirable.

Figure 5:
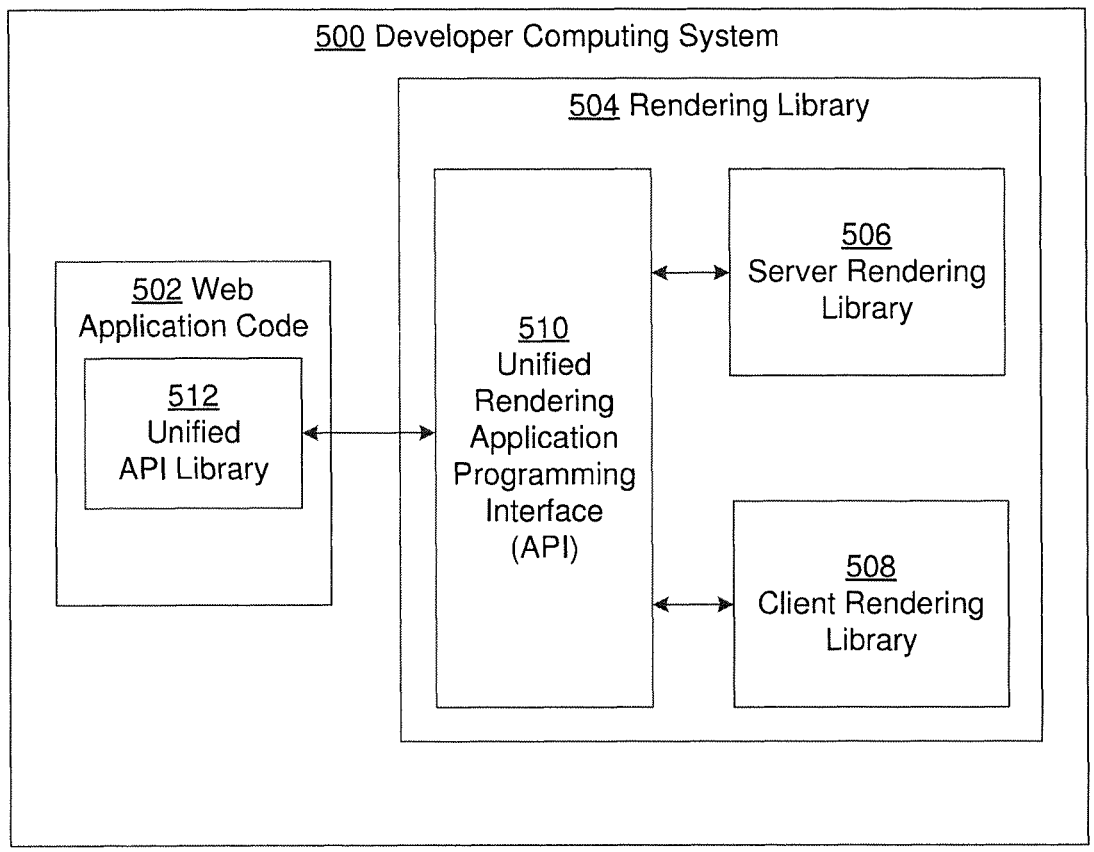
FIG. 5 shows a developer interface in accordance with disclosed embodiments.

FIG. 5 shows a developer interface in accordance with disclosed embodiments. In particular, FIG. 5 shows a diagram of a developer view of developing a web application. A developer computing system (500) includes web application code (502) connected to a rendering library (504). The rendering library (504) includes a server rendering library (506) and a client rendering library (508). The server rendering library (506) is the set of functions performed by the rendering engine that executes on the server computing system (described above with reference to FIG. 4). The client rendering library (508) is the set of functions performed by the rendering engine that executes on the client computing system (described above with reference to FIG. 3). In one or more embodiments, the server rendering library has the same set of functions as the client rendering library, and the client rendering library has the same set of functions as the server rendering library have the same set of functions. In other words, the function definitions are the same in that the functions have the same inputs and outputs. The implementation, such as particular algorithms used by the rendering library may be different to accommodate the different amount of data being processed. The server rendering library (506) and/or the client rendering library (508) may also use hidden subfunctions that are not exposed by the API (510).

Thus, in one or more embodiments, the server rendering library (506) and the client rendering library (508) expose the same unified rendering application programming interface (510). The unified rendering application programming interface (510) is a set of call definitions. In other words, the call definition are the same for a function in the server rendering library and the corresponding function in the client rendering library. A call definition is the function name, inputs for the function, and the number, data types, and format of outputs of the function. In one or more embodiments, the call definition in the server rendering library and the client rendering library use refer to an image object type as an input to the call. In one or more embodiments, the call definitions are the same in that the remaining inputs are the same. Various different library functions supported by both the server rendering library and client rendering library are described below with reference to FIGS. 6-11.

The unified rendering API (510) is connected to a unified API library (512) used in the web application code. The unified API library (512) is configured to connect to the server rendering engine or the client rendering engine depending on the whether the server computing system or the client computing system is selected as the rendering system. Specifically, the unified API library (512) includes connection interfaces for connecting via the network to the server rendering engine and connection interfaces for connecting via local calls the client rendering engine. Parameters for defining the connection, such as server name and/or protocol used, may be in the web application code (502).

In one or more embodiments, the web application code (502) includes unified rendering API calls that are the same regardless of whether the calls are for the server rendering library or the client rendering library. In particular the unified rendering API calls comply with the call definitions.

The web application code (502) may further include one or more object instantiations for one or more image objects. The object instantiation of the image object defines whether the server rendering engine or the client rendering engine is used. In particular, if the image object is instantiated as a server image object, then any call in the web application using the image object is to the server rendering library. Conversely, if the image object is instantiated as a client image object, then any call using the image object is to the client rendering library. Thus, by merely changing the instantiation, the rendering of the visualization may be performed on an entirely different machine.

In other embodiments, the instantiation of the image object does not define whether the server rendering engine or the client rendering engine is used. Rather, the unified API library includes instructions for gathering metrics and selecting the particular rendering engine based on whether the metrics satisfy a predetermined criterion.

Figure 6:
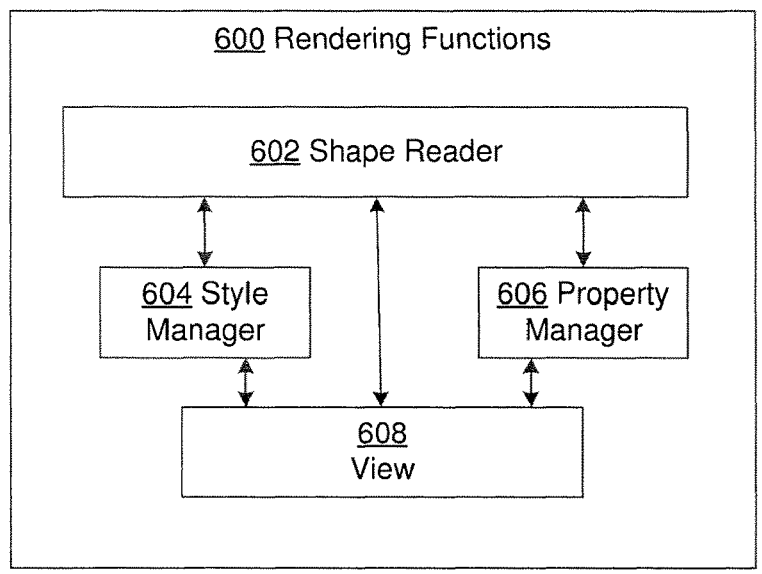
FIG. 6 shows an overview of a library in accordance with disclosed embodiments.

As described above, the rendering libraries expose the same library functions. FIGS. 6-11 show diagrams of a library functions in accordance with disclosed embodiments. FIG. 6 shows an overview of rendering functions (600) in accordance with disclosed embodiments. The shape reader (602) is a library function that takes, as input, a shape definition in the image data and produces a shape object. For example, the shape definition may be a JSON shape. The shape reader (602) is configured to instantiate a shape object, interpret the shape definition based on the type of shape, and populate the shape object accordingly. In one or more embodiments, the shape object is a polyline.

The shape type is the graphical type of shape. For example, the shape type may be a polyline shape type, point shape type, triangular shape type, or other shape type that defines the shape.

The shape reader (602) may be optionally connected to a style manager (604) and a property manager (606). The shape reader (602) may pass the shape object to the style manager (604) and the property manager (606). The style manager (604) is configured to apply a style to the rendering of the shape. The style is the set of parameters common to a type of shape object that can provide more rendering options without reloading shape object or shape definition. For example, the style may include a line thickness, texture, material composition, line color, etc. The style is specific to the type of shape object. Different types of shape objects may exist. For example, each oilfield property, such as the various rock properties, reservoir properties, equipment properties, etc. may have individually defined shape object types for the particular property. Each shape object type is related to a style.

The property manager (606) is configured to manage the property values related to the shape. The property is the oilfield property defined for the shape type. The property manager manages the visual scale of colors used to render the shape for the particular property. The visual scale of colors is the color table that maps colors to property values of the oilfield property. The property manager may have the same property for different shape types or different property objects for different shape types.

The view (608) is connected to the shape reader (602), the style manager (604), and the property manager (606). Specifically, the view (608) is configured to create a visualization from the shape objects from the shape reader (602). The view (608) includes functionality to create the visualization using the style from the style manager (604) and the property from the property manager (606). The view creator may further create the visualization based on the canvas type (not shown) and the rendering context (not shown). The canvas type specifies the type of rendering, navigation, interaction for a given type of window. For example, the canvas type may specify three dimensional, two dimensional, seismic interpretation, pipeline network, borehole centric visualization, etc. The rendering context is the set of parameters related to canvas. For example, the rendering context may be the resolution, local coordinate system, scale, and other aspects of the rendering.

In one or more embodiments, the infrastructure is extensible and allows the developers to create shape readers, style managers, canvas types, etc. The infrastructure is extensible through the following mechanisms. Factory structures are used, to which a web application can register the web application's own shapes, shape readers, views as well as collections of styles and properties. Polymorphism of base classes and predefined shapes and views may be used. The definition of json metadata describing geometry and enabling identical behavior between different canvases, renderers and clients may be used to extend the shape object types.

Figure 7:
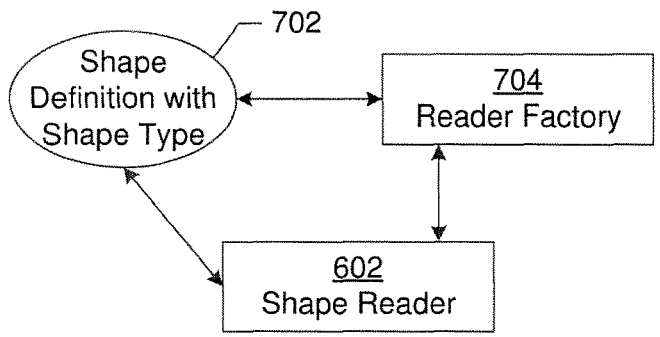
FIG. 7 shows a diagram of shape reader library functions in accordance with disclosed embodiments.

In FIGS. 7-11, ovals are used to represent data being passed while rectangles represent library functions. FIG. 7 shows a diagram of shape reader library functions in accordance with disclosed embodiments. A shape definition having a shape type (702) is received. The shape type is sent as a query to the reader factory (704), which is configured to identify the shape reader (706) defined for the shape type. The identified shape reader (602) that is specific to the shape type obtains the shape definition (702), parses the shape definition (702), and creates the shape object accordingly.

Figure 8:
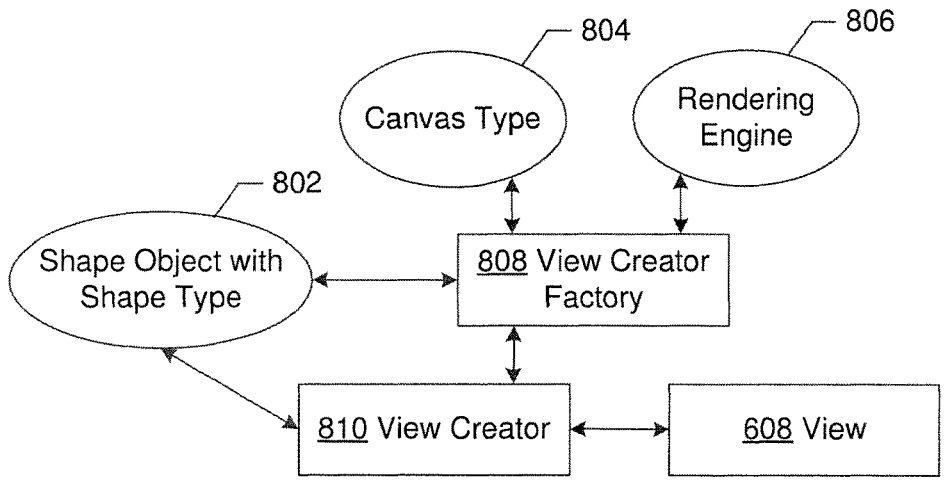
FIG. 8 shows a diagram of view creator library functions in accordance with disclosed embodiments.

FIG. 8 shows a diagram of view creator library functions in accordance with disclosed embodiments. The shape object with a shape type (802) is obtained, such as from the shape reader. The shape type is passed to the view creator factory (808) along with the canvas type (804) and the rendering engine (806). The view creator factory (808) instantiates a view creator (810) for the shape object type, canvas type and rendering engine. The view creator (810) creates a view (608) for the shape. The view (608) is notified when the shape changes in order to update the visualization.

Figure 9:
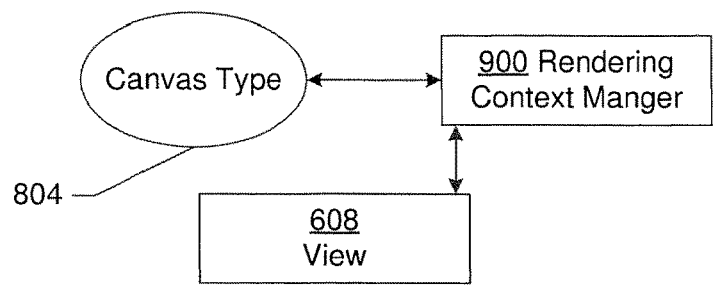
FIG. 9 shows a diagram of a view library function in accordance with disclosed embodiments.

FIG. 9 shows a diagram of a view library function (608) in accordance with disclosed embodiments. The canvas type (804) is passed to the rendering context manager (900) that defines the rendering context accordingly. The rendering context is the set of parameters that are specific to canvas type that are specific to the rendering. For example, the rendering context may include the scaling of the canvas. The rendering context is then passed to view (608) to create the visualization. When the canvas type (804) is updated, the rendering context manager (900) updates the rendering context and passes the updated rendering context to the view (608) to update the visualization. The contexts are connected to events, and the view listening to rendering context.

Figure 10:
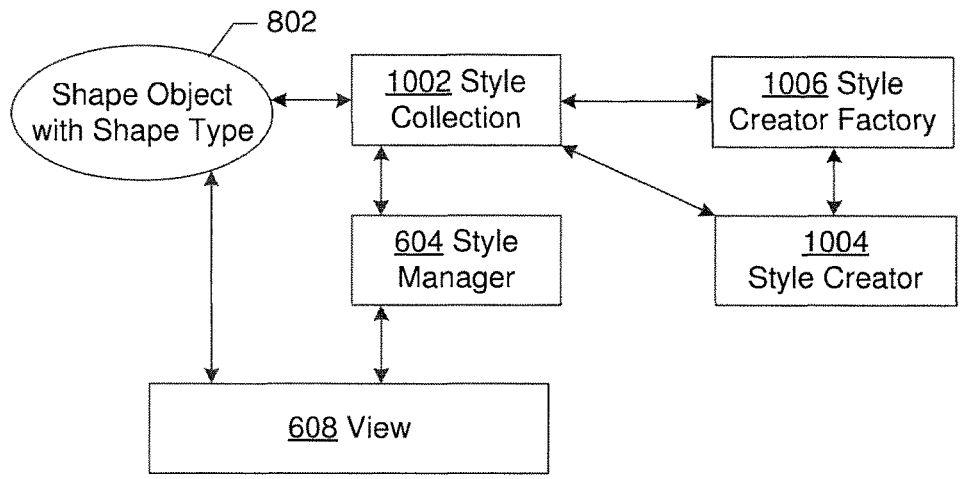
FIG. 10 shows a diagram of style management library functions in accordance with disclosed embodiments.

FIG. 10 shows a diagram of style management library functions in accordance with disclosed embodiments. The shape type (802) of a shape object is passed to a style collection (1002) library function. The style collection library function (1002) determines whether a style manager (604) exists matching the shape type and a canvas type (not shown). If a style manager (604) does not exist that matches the shape type and canvas type, then the style creator factory (1006) is queried to create a new style manager for the shape type and canvas type. The style creator (1004) creates the style manager and stores the style manager (604) into the style collection (1002). The style manager (604) sends the style to the view (608) and updates the view (608) when the style changes.

Figure 11:
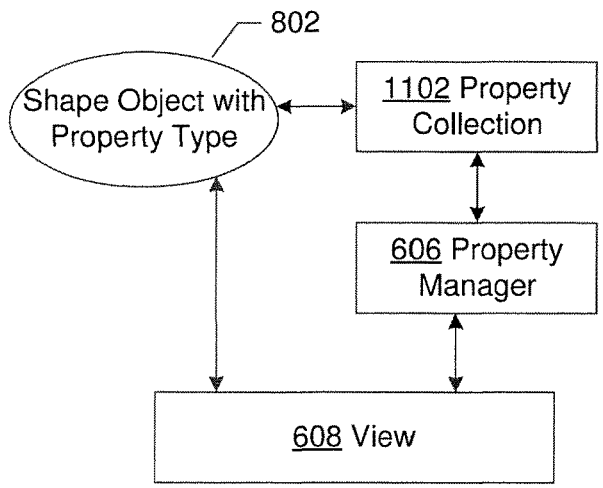
FIG. 11 shows a diagram of property management library functions in accordance with disclosed embodiments.

FIG. 11 shows a diagram of property management library functions in accordance with disclosed embodiments. The shape object (802) has a property type corresponding to the property represented by the shape object. The property type is passed to the property collection (1102) that identifies the property manager (606). The property manager (606) sends the property information to the view (608) and updates the view (608) when the property information changes.

While FIG. 1-11 shows a configuration of components, other configurations may be used without departing from the scope of the invention. For example, various components may be combined to create a single component. As another example, the functionality performed by a single component may be performed by two or more components.

Figure 12:
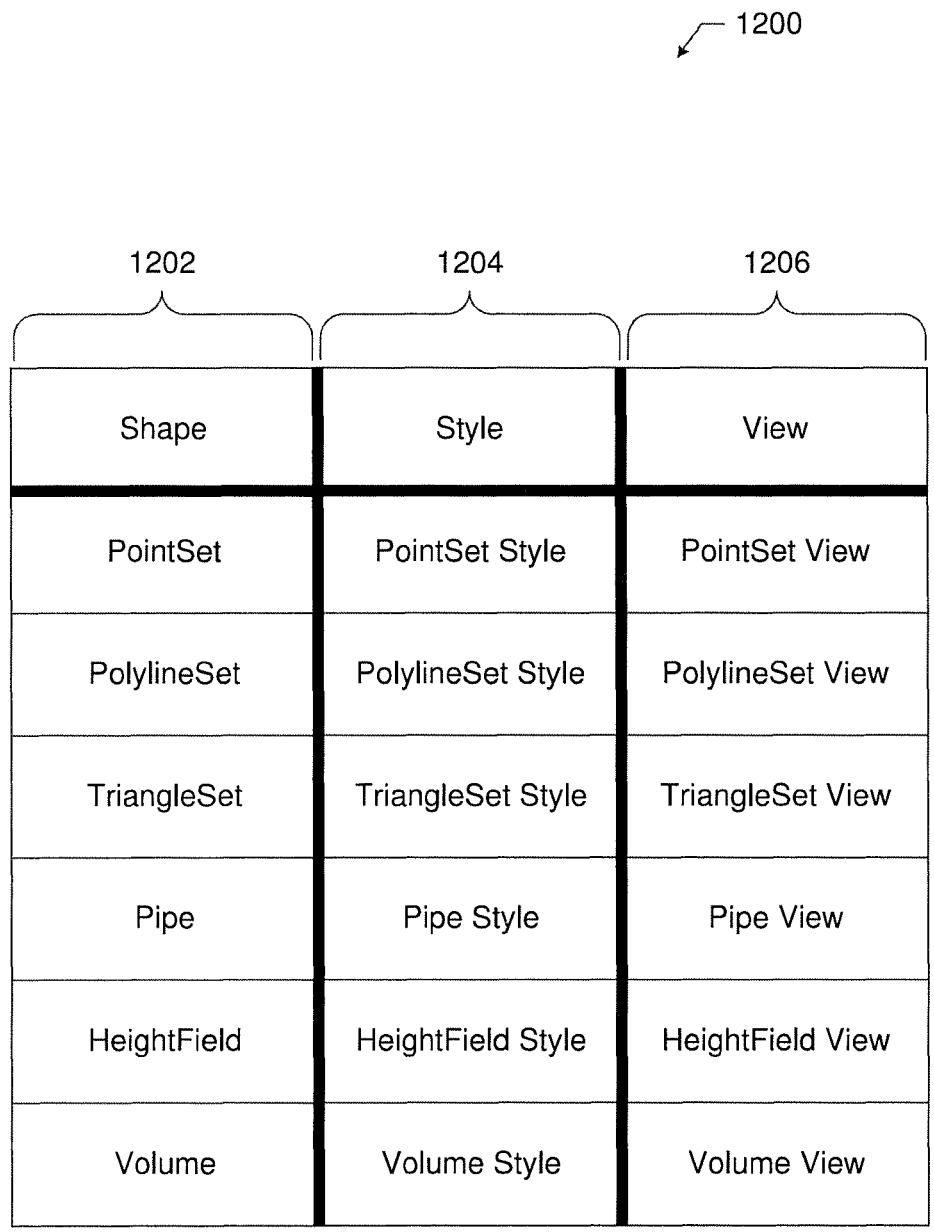
FIG. 12 shows a diagram of predefined objects in accordance with disclosed embodiments.

FIG. 12 shows a diagram of predefined objects types (1200) in accordance with disclosed embodiments. The predefined objects are object types that are provided by the infrastructure including the rendering library that are already defined. Additional object types may be added to the infrastructure. As shown, the predefined object types include shape types as shown in the shape column (1202), style types as shown in the style column (1204), and view types as shown in the view column (1206). Each shape type has at least one corresponding style type and view type. For example, the TriangleSet shape type has a TriangleSet style and TriangleSet view.

Figure 13:
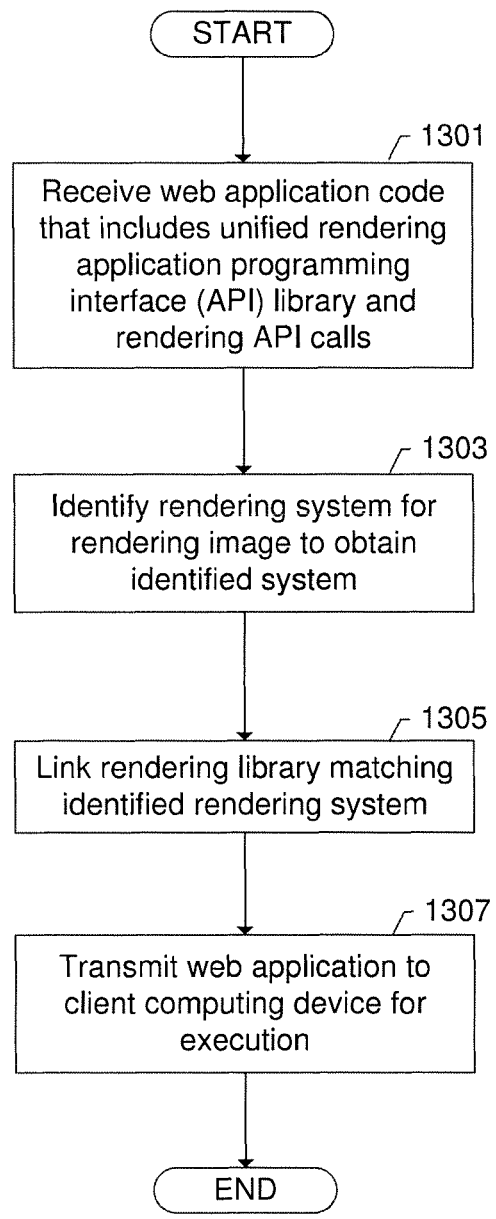
FIG. 13 shows a diagram of developing a web application in accordance with disclosed embodiments.

FIG. 13 shows a diagram of developing a web application in accordance with disclosed embodiments. While the various blocks in this flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments of the invention.

In Block 1301, a web application code is received that includes a unified rendering API library and rendering API calls. The web application code may be received by the developer computer system, for example, as the developer is writing the code. By way of another example, the web application code may be received by the application server that transmits the web application to client computing devices. The web application code may be written in a scripting computer language, and, thus, the web application and the web application code may be the same.

In Block 1303, the rendering system for rendering the image is identified to obtain the identified system. Within the web application code is a link to the unified API library. Specifically, a command to include the unified API library may be included. The unified API library is configured to interpret an API call that includes an instantiation request for an image object as a request for a particular rendering system. Thus, identifying the rendering system is to identify the types of the image objects referenced in the web application.

The corresponding rendering library that matches the selected system is linked to the web application in Block 1305. Rendering API calls are interpreted as links to the identified rendering system.

In Block 1307, the web application is transmitted to the client computing device for execution. The web application is deployed to the application servers. The application servers transmits the web application to the web browser upon requests from client computing devices. On the client side, one or more visualizations may be rendered as described above with reference to FIG. 3 and/or one or more visualization may be rendered as described above with reference to FIG. 4.

In some embodiments, the decision as to the rendering system is used based on when the web application is received rather than when the web application is developed. For example, an analyzer may analyze the amount of data in the selected image definitions, the parameters within the rendering API calls along with other metrics and determine whether the rendering system should be the client computing system or the server computing system. The analyzer may then add a link in the web application to link the web application to the particular rendering library matching the selected system. The metrics may be heuristics determined from previous web application and visualizations as well as the current web application.

Figure 14:
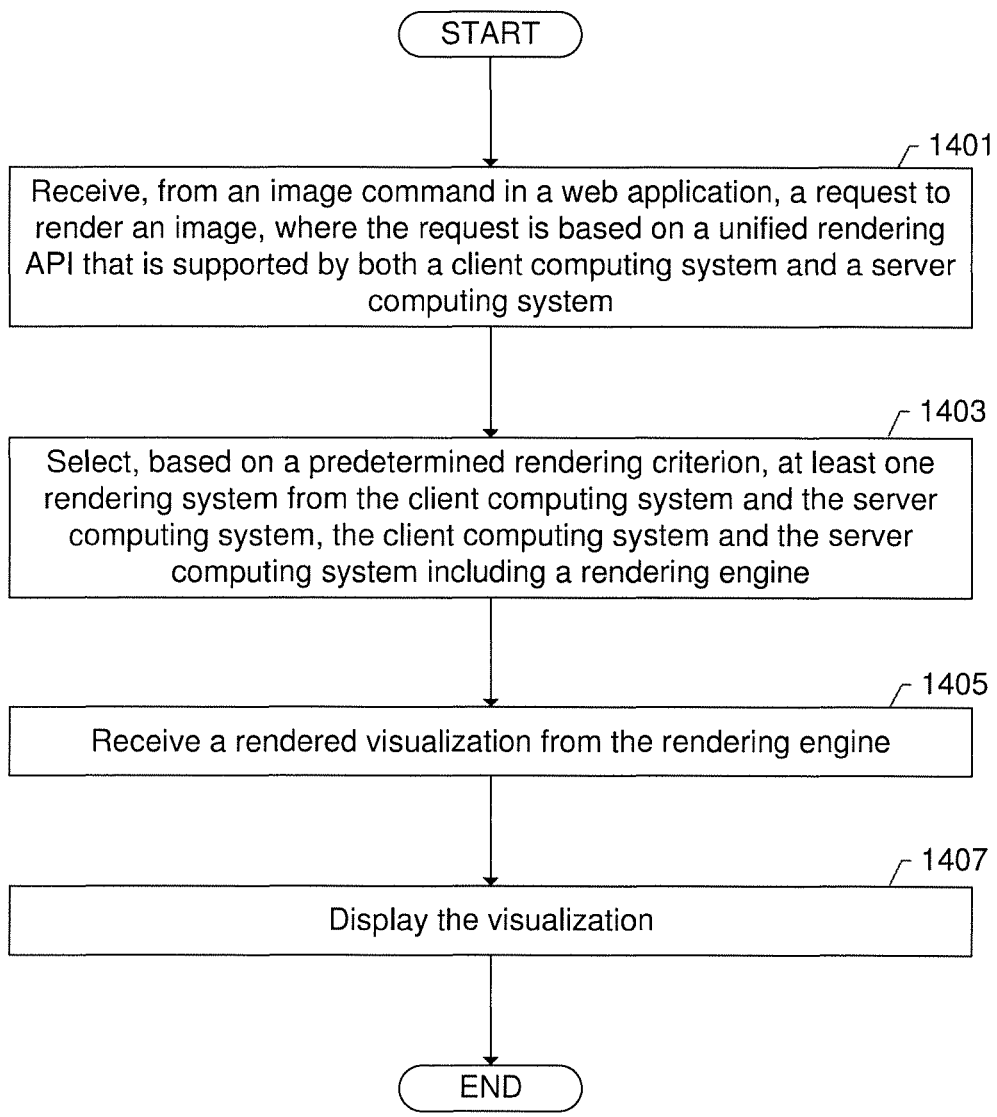
FIG. 14 shows a diagram of executing a web application in accordance with disclosed embodiments.

FIG. 14 shows a diagram of executing a web application in accordance with disclosed embodiments. While the various blocks in this flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments of the invention.

FIG. 14 shows an example of performing the selection of the rendering system to use during runtime. In Block 1401, from an image command in a web application, a request to render an image is received. The request is based on a unified rendering API that is supported by both the client computing system and the server computing system. The unified API library executing in the web application receives the request. Because both client computing system and the server computing system have the same library functions, the unified API library may be configured to gather metrics describing the executing of the web application. For example, the unified API library may determine the latency for receiving responses from the server computing system.

In Block 1403, based on a predetermined rendering criterion, at least one rendering system from the client computing system and the server computing system is selected. Because both the client computing system and the server computing system include the rendering engine that supports the same unified rendering API calls, either the client computing system or the server computing system may be selection. The predetermined criterion may be rules, such as whether one or more metrics satisfy one or more thresholds.

The unified API library transmits the unified rendering API calls to the selected rendering system. In Block 1405, the rendered visualization is received from the rendering engine that is selected. The rendered visualization may be transmitted via the network and received from the network or transmitted using inter process communication techniques.

In Block 1407, the visualization is displayed. The visualization is displayed on a display device within a web browser window in one or more embodiments.

Figure 15:
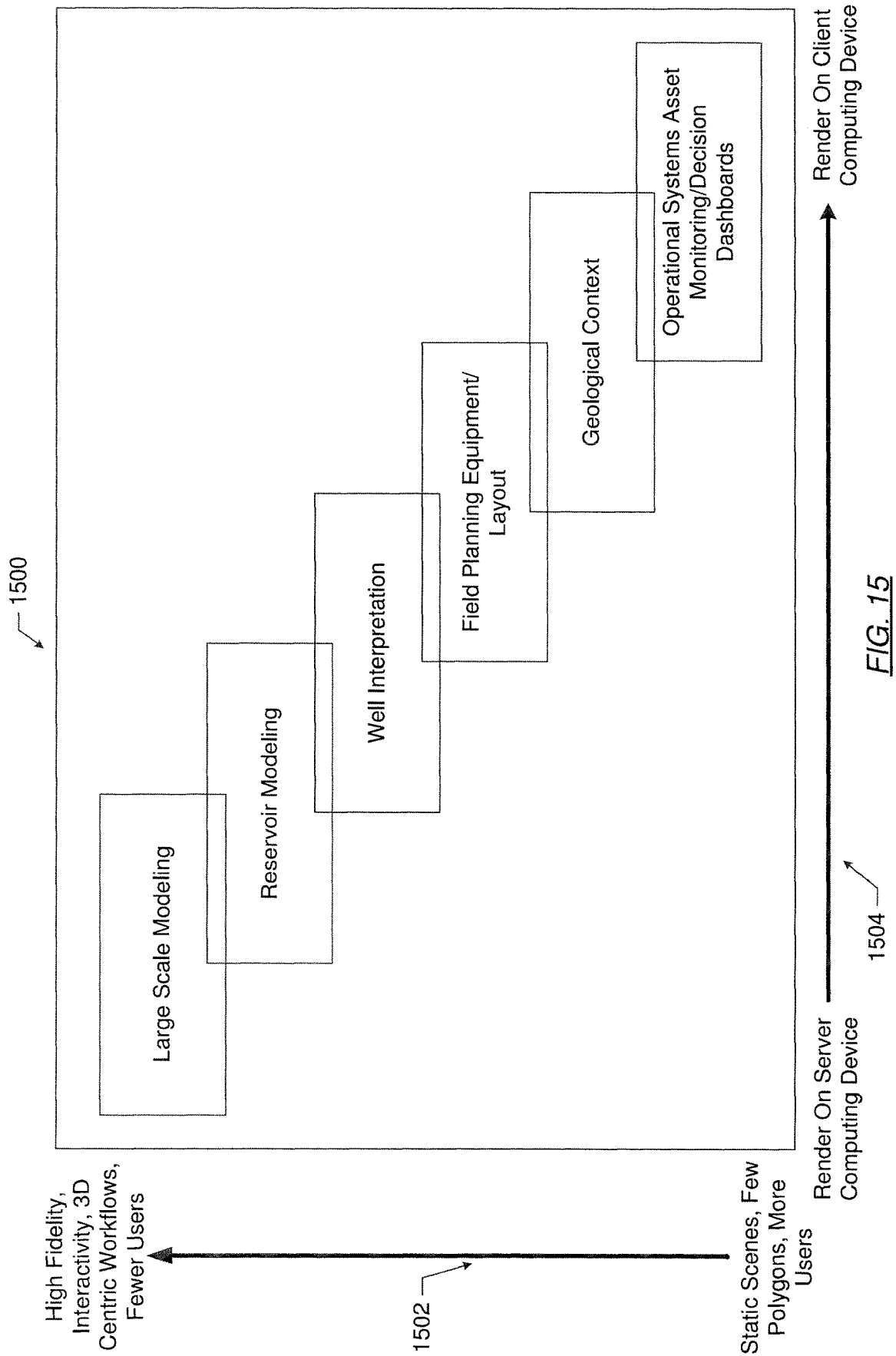
FIG. 15 shows an example graph in accordance with disclosed embodiments.

FIG. 15 shows an example graph (1500) in accordance with disclosed embodiments. In particular, FIG. 15 is a graph showing different metrics and corresponding uses of web applications in which a particular rendering system is more desirable over another rendering system in the oilfield domain. The y-axis (1502) represents metrics of the corresponding web applications. The x-axis (1504) represents the desirability of using a particular web application. For example, the bottom of the y-axis is when the web application has visualizations that generally involve static scenes, fewer polygons and more users while the top of the y-axis is higher fidelity, interactive visualizations involving three dimensional workflows and fewer users. Between the top of the y-axis and the bottom is the range of different values for the metrics. The left side of the x-axis indicates a greater desirability to render on the server computing system and the right side is a greater desirability to render on the client computing system. In between is the range by which the desirability transitions from using one computer system to the other computing system.

As shown in the graph, operational system and asset monitoring, and decision dashboards are more desirable to render on the client computing system because the visualizations are static, fewer polygons exist making rendering on the client a possibility. More users means that the server is not overloaded with rendering requests for rendering a visualization for each user.

However, for large scale modeling and reservoir model, that has large amounts of data and complicated visualizations, the server computing system as the rendering system is desired. Thus, the latency to transmit the selected image definitions to the client computing system does not affect the rendering.

Figure 16:
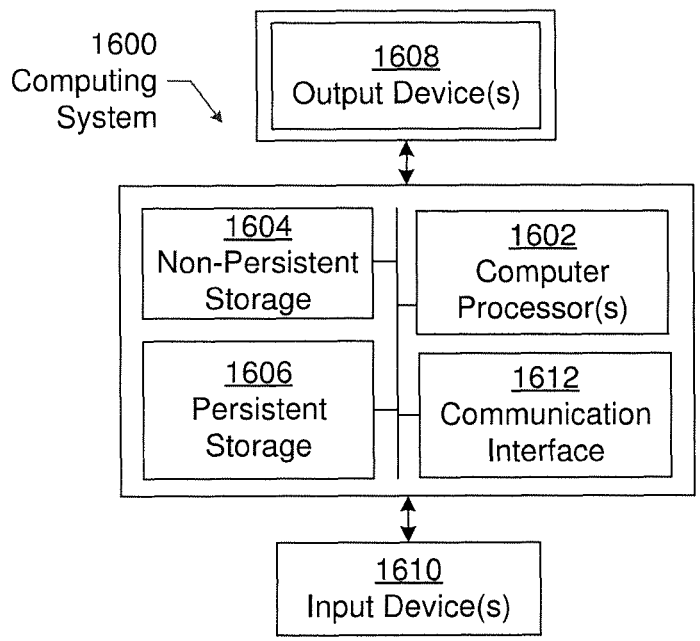
FIG. 16 and FIG. 17 show a computing system in accordance with one or more embodiments of the invention.
Figure 17:
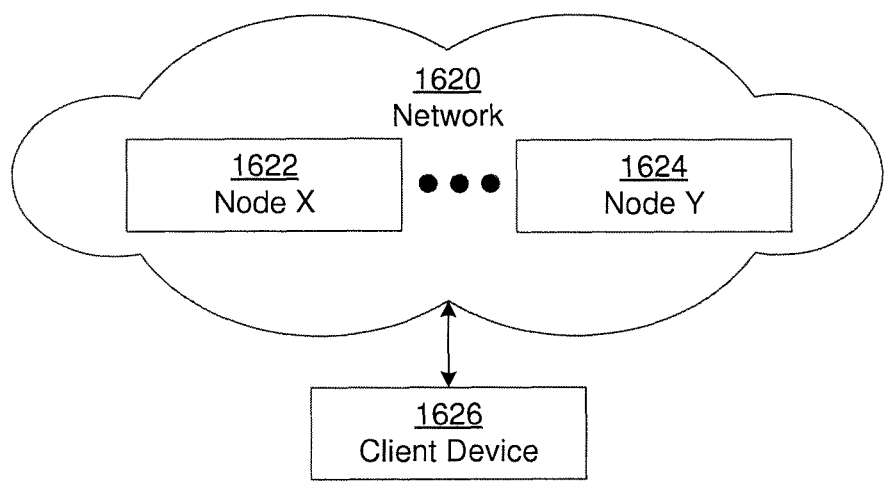

FIG. 16 and FIG. 17 show a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 16, the computing system (1600) may include one or more computer processors (1602), non-persistent storage (1604) (e.g., volatile memory, such as random access memory (RAM), cache memory), persistent storage (1606) (e.g., a hard disk, an optical drive such as a compact disk (CD) drive or digital versatile disk (DVD) drive, a flash memory, etc.), a communication interface (1612) (e.g., Bluetooth interface, infrared interface, network interface, optical interface, etc.), and numerous other elements and functionalities.

The computer processor(s) (1602) may be an integrated circuit for processing instructions. For example, the computer processor(s) may be one or more cores or micro-cores of a processor. The computing system (1600) may also include one or more input devices (1610), such as a touchscreen, keyboard, mouse, microphone, touchpad, electronic pen, or any other type of input device.

The communication interface (1612) may include an integrated circuit for connecting the computing system (1600) to a network (not shown)(e.g., a local area network (LAN), a wide area network (WAN) such as the Internet, mobile network, or any other type of network) and/or to another device, such as another computing device.

Further, the computing system (1600) may include one or more output devices (1608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1602), non-persistent storage (1604), and persistent storage (1606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (1600) in FIG. 16 may be connected to or be a part of a network. For example, as shown in FIG. 17, the network (1620) may include multiple nodes (e.g., node X (1622), node Y (1624)). Each node may correspond to a computing system, such as the computing system shown in FIG. 16, or a group of nodes combined may correspond to the computing system shown in FIG. 16. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1600) may be located at a remote location and connected to the other elements over a network.

Although not shown in FIG. 17, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1622), node Y (1624)) in the network (1620) may be configured to provide services for a client device (1626). For example, the nodes may be part of a cloud computing system. The nodes may include functionality to receive requests from the client device (1626) and transmit responses to the client device (1626). The client device (1626) may be a computing system, such as the computing system shown in FIG. 16. Further, the client device (1626) may include and/or perform all or a portion of one or more embodiments of the invention.

The computing system or group of computing systems described in FIGS. 16 and 17 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention.

The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 16. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 16, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 16 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 16 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 16 and the nodes and/or client device in FIG. 17. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for developing comprising:
    receiving, for a web application, web application code comprising a unified rendering application programming interface (API) library and a plurality of unified rendering API calls, the plurality of unified rendering API calls complying with a plurality of call definitions, the plurality of unified rendering API calls to a plurality of library functions, each of the plurality of library functions in both a server rendering library and a client rendering library, wherein the plurality of call definitions are the same for using the server rendering library and the client rendering library;
    identifying, from a client computing device and a server computing device and based on a predetermined rendering criterion, a first rendering system for rendering a first visualization to obtain a first identified system;
    linking a first rendering library matching the first rendering system to the web application code, the first rendering library being selected from a group consisting of the client rendering library and the server rendering library;
    detecting that the predetermined rendering criterion has a changed value;
    identifying, from the client computing device and the server computing device and based on the changed value of the predetermined rendering criterion, a second rendering system for rendering a second visualization to obtain a second identified system;
    linking a second rendering library matching the second rendering system to the web application code, the second rendering library being selected from the group consisting of the client rendering library and the server rendering library, the second rendering library being a different rendering library than the first rendering library; and
    transmitting the web application to the client computing device.

2. The method of claim 1, wherein, when the client computing device is selected as the first rendering system, the client computing device renders the first visualization using the plurality of library functions defined in the client rendering library.

3. The method of claim 1, wherein, when the server computing device is selected as the second rendering system, the web application issues a call to the server computing device to render the second visualization and receives the second visualization from the server computing device.

4. The method of claim 1, wherein the web application code comprises an instantiation of an image object, and wherein the first rendering system is identified according to the instantiation.

5. A non-transitory computer readable medium comprising computer readable program code for a web application, the computer readable program code comprising instructions for:
    receiving, from a first image command in the web application, a first request to render a visualization, wherein the first request is based on a unified rendering application programming interface that is supported by both a client computing system and a server computing system, the client computing system executing the web application;
    selecting, based on a predetermined rendering criterion, a rendering system selected from a group consisting of the client computing system and the server computing system, the client computing system and the server computing system both comprising a rendering engine;
    receiving a first rendered visualization from the rendering engine executing on the rendering system;
    displaying the first rendered visualization;
    receiving, from a second image command in the web application, a second request to render a visualization, wherein the second request is based on the unified rendering application programming interface;
    detecting that the predetermined rendering criterion has a changed value;
    selecting, based on the changed value of the predetermined rendering criterion, a different rendering system than the rendering system that rendered the first rendered visualization, the first rendered visualization rendered from an image definition;
    receiving a second rendered visualization from the rendering engine executing on the different rendering system, the second rendered visualization rendered from the image definition used for the first rendered visualization; and
    displaying the second rendered visualization.

6. The non-transitory computer readable medium of claim 5, wherein the predetermined rendering criterion comprises a size of the image definition corresponding to the first rendered visualization.

7. The non-transitory computer readable medium of claim 5, wherein the predetermined rendering criterion comprises a number of client computing systems concurrently executing the web application and using an image definition corresponding to the first rendered visualization.

8. The non-transitory computer readable medium of claim 5, wherein the predetermined rendering criterion comprises an estimated level of interactivity with the first rendered visualization.

9. A computing system comprising:
a processor; and
a memory for storing a rendering library, the rendering library comprising:
a server rendering library comprising instructions for:
receiving, from a web application executing on a client computing system and based on a predetermined rendering criterion, a first request to render a visualization,
rendering a plurality of selected image definitions into a visualization, and
sending the visualization to the client computing system,
a client rendering library comprising instructions for:
detecting a changed value of the predetermined rendering criterion;
receiving, from the web application executing on a client computing system and based on the changed value of the predetermined rendering criterion, a second request to render the visualization,
rendering the plurality of selected image definitions into the visualization, and
presenting the visualization on the client computing system, and
a unified rendering application programming interface comprising a plurality of call definitions to a plurality of library functions, each of the plurality of library functions in both the server rendering library and the client rendering library, wherein the plurality of call definitions are the same for using the server rendering library and the client rendering library.

10. The computing system of claim 9, wherein the plurality of library functions comprises:
a shape reader library function configured to read a shape definition in the plurality of selected image definitions and create a shape; and
a view creator library function configured to render a portion of the visualization from the shape.

11. The computing system of claim 10, wherein the plurality of library functions comprises:
a property manager library function configured to manage a property definition for the visualization.

12. The computing system of claim 11, wherein the plurality of library functions comprises:
a property collection library function configured to manage a plurality of property type definitions, the property collection library function connected to the property manager library function.

13. The computing system of claim 10, wherein the plurality of library functions comprises:
a style manager library function configured to manage a style definition for the visualization.

14. The computing system of claim 13, wherein the plurality of library functions comprises:
a style creator factory library function configured to create an instance of a style creator library function, the style creator library function configured to create a style for the shape.

15. The computing system of claim 14, wherein the plurality of library functions comprises:
a style collection library function connected to the style creator factory library function and the style creator library function, the style collection library functions configured to manage a plurality of styles.

16. The computing system of claim 10, wherein the plurality of library functions comprises:
a view creator factory library function configured to create an instance of the view creator library function based on a shape type of the shape, a canvas type of the visualization, and a rendering engine.

17. The computing system of claim 10, wherein the view creator library function is configured to receive a canvas type.

18. The computing system of claim 10, wherein the plurality of library functions comprises:
a reader factory library function configured to create an instance of the shape reader library function based on a shape type of the shape.

19. The computing system of claim 9, wherein at least one of the client rendering library and the server rendering library is identified by an instantiation of an object in the web application.

* * * * *